(12) United States Patent
Kruss

(10) Patent No.: US 7,322,813 B2
(45) Date of Patent: Jan. 29, 2008

(54) TECHNOLOGY OF PRODUCTION OF ELASTOMERIC SLEEVES

(75) Inventor: Sergey Kruss, Millis, MA (US)

(73) Assignee: Applicont, LLC, Millis, MA (US)

( * ) Notice: Subject to any disclaimer, the term of this patent is extended or adjusted under 35 U.S.C. 154(b) by 550 days.

(21) Appl. No.: 10/427,340

(22) Filed: May 1, 2003

(65) Prior Publication Data

US 2003/0219505 A1    Nov. 27, 2003

Related U.S. Application Data

(60) Provisional application No. 60/382,832, filed on May 23, 2002.

(51) Int. Cl.
*B29C 41/14* (2006.01)
*B29C 41/38* (2006.01)

(52) U.S. Cl. ........................ 425/275; 264/306

(58) Field of Classification Search ............... 425/269, 425/270, 275; 264/301, 306
See application file for complete search history.

(56) References Cited

U.S. PATENT DOCUMENTS

| | | | |
|---|---|---|---|
| 3,679,342 A * | 7/1972 | Fougeray et al. | ............ 425/275 |
| 3,978,187 A | 8/1976 | Fletcher | |
| 5,143,762 A | 9/1992 | Ho | |
| 5,194,204 A * | 3/1993 | Adasch et al. | ............. 264/651 |
| 5,592,953 A | 1/1997 | Delao | |
| 6,276,364 B1 | 8/2001 | Warner | |
| 6,479,005 B1 | 11/2002 | Hsien | |

FOREIGN PATENT DOCUMENTS

| GB | 2134949 A | * | 8/1984 |
|---|---|---|---|
| JP | 63256412 A | * | 10/1988 |
| JP | 05192947 A | * | 8/1993 |

OTHER PUBLICATIONS

Dominick V. Rosato et al, Plastics Design Handbook, 2001, Kluwer Academic Publishers, p. 202.*

* cited by examiner

*Primary Examiner*—Robert B. Davis
(74) *Attorney, Agent, or Firm*—Devine, Millimet & Branch; Raymond I. Bruttomesso, Jr.; Paul C. Remus

(57) ABSTRACT

Presented is a method of manufacturing opened at both ends thin walled elastomeric sleeves of complex shapes. The proposed technique employs standard dip molding process but with modifications which enable producing of opened at both ends sleeves right from the drying stage and eliminates the necessity of cutting lower dipped ends subsequently to the dipping process. This technique allows sleeves to be manufactured with rolled beads at both ends. The main benefit of the present invention is a possibility of manufacturing sleeves on existing standard automated and semi-automated dip molding lines, traditionally used for manufacturing elastomeric gloves and condoms. The gist of the invention is a composition of a dipping former with a bottom coated by hydrophobic material such as PTFE. This composition impedes buildup of coagulant and coagulum on the bottom. The loose coagulum layer is removed by means of washing off with directed and appropriately timed sprinklers. As a result the bottom of the former is completely clean of coagulum prior to commencement of drying and curing process, whereby the resulting sleeve is opened at both ends. At the bead rolling stage of the process two sets of rolling brushes may be employed instead of one, whereby sleeves with both ends finished with rolled beads are obtained.

7 Claims, 5 Drawing Sheets

TECHNOLOGY OF PRODUCTION OF ELASTOMERIC SLEEVES

CROSS-REFERENCE TO RELATED APPLICATION

This application claims the benefit of Provisional Patent Application No. 60/382,832, filed May 23, 2002, titled "Technology of Production of Elastomeric Sleeve".

FEDERALLY SPONSORED RESEARCH

Not applicable

MICROFICHE APPENDIX

Not applicable

BACKGROUND OF THE INVENTION

The present invention relates to the modifications of dip molding technology, such as used in production of medical gloves and condoms, in order to adapt the established process for automated manufacturing of thin-walled elastomeric sleeves with both ends opened and finished with rolled beads.

Up until now the art of automated and semi-automated production of thin-walled elastomeric sleeves of complex shapes with both finished ends has not been developed. Small batches of sleeves from latex and like materials with rolled beads at both ends have been manufactured by several companies, however, the employed process is excessively labor intensive and therefore expensive. The technique presently used relies largely on manual labor, which prevents large scale production.

Meanwhile the demand for this kind of sleeves is rather high, particularly in the healthcare field where exists an urgent need for resilient water-resistant disposable protective sleeves. This demand is reflected in a number of United States patents, particularly the U.S. Pat. No. 6,276,364, issued on Aug. 21, 2001. U.S. Pat. No. 5,143,762 and U.S. Pat. No. 5,592,953 further confirm the necessity for low cost disposable sleeves.

Nowadays the art of producing thin-walled natural and synthetic rubber articles is perfectly developed and employs a very well established technique called dip molding. This technique is used primarily for manufacturing natural and synthetic rubber gloves, condoms, finger cots and like objects. The dip molding process is largely automated and is performed by continuous mechanical lines whereon sets of special formers are moved sequentially from one stage to the next. Along the way the formers are dipped first in coagulant, then in elastomeric suspension also passing on their way leaching and drying intermediate stages. After drying coagulum layer covering the formers turns into natural or synthetic rubber. After the drying is completed, most types of production are taken through the stage of bead rolling. We can distinguish two major types of production lines: automated and semi-automated (AKA "batchtype"). On automated lines beading is performed by special brushes whereas on batch lines—in most cases—manually. Eventually the formers pass the curing oven, after which the finished rubber articles are stripped from formers.

Automation of manufacturing thin-walled sleeves of latex and like elastomeric materials is prevented by the contradiction inherent to the nature of the dip molding technique whereby it is required that a former is dipped first in coagulant and then in suspension (normally aqueous) of natural or synthetic latex, which causes the lower end of the former to be covered by latex coagulum, which after subsequent drying and curing turns into thin-walled synthetic or natural rubber article. Inevitably the lower end of a former in such a process has to be enclosed in coagulum and—after curing—in thin layer of rubber. In order to produce sleeves, opened at both ends and having rolled beads at both ends, the rubber encasements are cut off the lower ends of the formers and stripped from the formers before the sleeves produced in this manner are vulcanized. Employing such sequence enables the raw rubber to stick to itself and form a bead. Once the bead rolling is completed at both ends, the dry latex article can be finally cured and stripped from the former. Such technique, however, is very involved and labor intensive, which drives up the cost of elastomeric sleeves and hinders large scale manufacturing, required for production low cost disposable devices.

A number of patents, particularly U.S. Pat. No. 3,978,187 suggest modifications of dip molding techniques which could allow automation of production thin-walled elastomeric sleeves, however these methods drastically break away from the universally adapted dip molding technology, therefore requiring dramatic and expensive restructuring of the industry in order to produce the sleeves. Besides the method suggested in the U.S. Pat. No. 3,978,187 does not provide for easy bead rolling.

The invention proposed herein prescribes a set of simple and inexpensive modifications to the existing technology which allows to avoid the inherent contradictions of the presently accepted methods and to implement automated and semi-automated (batch) production of thin-walled elastomeric sleeves of complex shapes with beads at both ends. The method described hereinafter is derived from and is based upon established standard manufacturing procedures, thus providing inexpensive transition from manufacturing gloves or condoms to producing thin-walled elastomeric sleeves. The objective of this invention is to provide inexpensive means of mass production of synthetic and natural rubber sleeves employing existing manufacturing facilities.

BRIEF SUMMARY OF THE INVENTION

The present invention dictates a special composition for dip molding formers and particular modifications of the dip molding process and dip molding lines in order to adapt standard dip molding technology for producing thin-walled elastomeric sleeves of complex shapes with openings and rolled beads at both ends.

The proposed composition of the formers prescribes that the bottoms of the formers be given flat or concave shape and coated with strongly hydrophobic material such as PTFE. This coating precludes coagulant and elastomeric coagulum from sticking to the bottoms of the formers and facilitates washing the whatever present residual coagulum off said bottoms.

The modifications of the dip molding production lines comprise installation of the upright directed sprinklers in the production lines following the latex dipping stage. After dipping the former into the latex suspension and while the formers pass over the sprinklers the latter must be briefly turned on so that the PTFE coated bottoms of the formers are washed with jets of water. Thus the loose layer of elastomeric coagulum is washed off the bottoms of the formers leaving only the walls of the formers covered with elastomer. Subsequently after drying only the walls of the former remain covered with the thin layer of elastomer.

At this stage rolled beads may be formed at both ends of the sleeve, after which the vulcanization may be commenced. In case of using this technique for fully automated production the present invention prescribes that in addition to the set of bead rolling brushes already present on glove making machines the second set of brushes be installed in order to roll the lower beads on the sleeves.

Optionally the upright directed sprinklers may be installed in the production line after the coagulant dipping stage, and the bottoms of the formers shall be washed after dipping in coagulant. This measure would further facilitate the removal of residual latex from the bottoms of the formers.

A slightly concave shape of the bottom of the former enables better rebounding of the washing jet from the bottom which prevents water from washing coagulum from the longitudinal walls of the former. Although not necessary this feature is intended to improve the process.

A different embodiment of the present invention suggests that the bottom of the former bearing hydrophobic coating is given a pointed or conic shape, and the sprinklers are installed in such a way to direct washing jets at said bottom in the direction of its tip, away from the non-coated longitudinal walls of the former. Such configuration allows cleaner removal of coagulum remnants and at the same time eliminates air entrapment during dipping.

Figure 1:
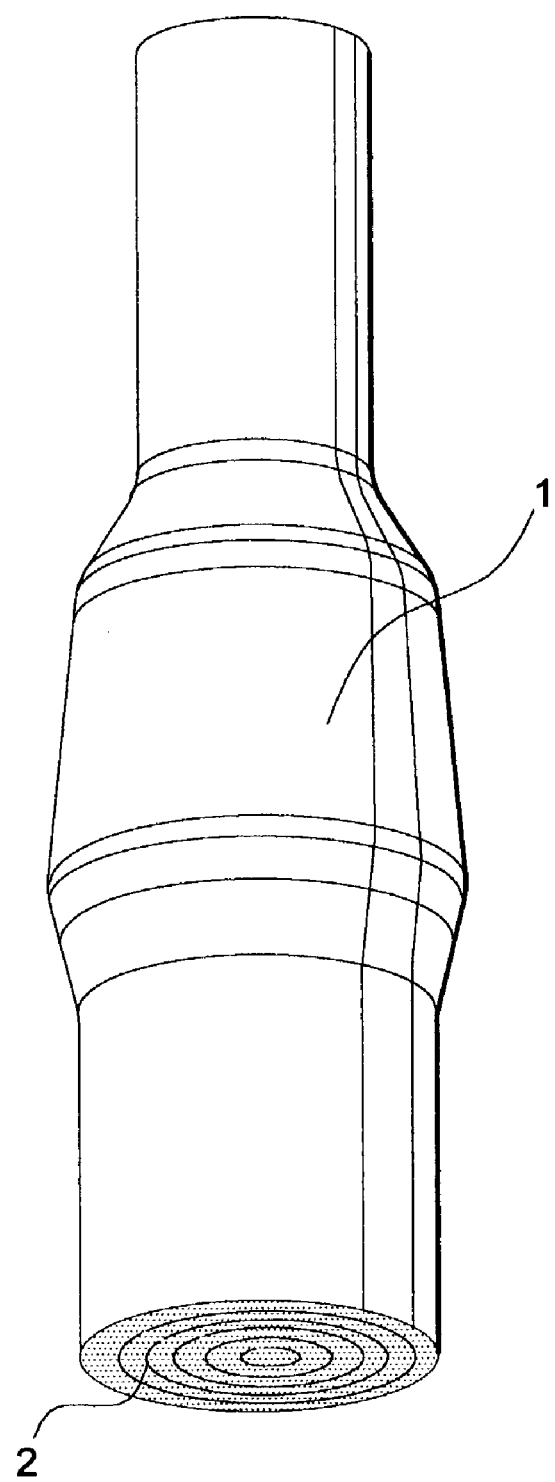
FIG. 1 is a perspective front-bottom view of a complex shape sleeve former with a flat bottom covered with hydrophobic coating.

REFERENCE NUMERALS IN DRAWINGS 1 body of the sleeve former
2 bottom of the sleeve former coated with a hydrophobic layer
3 sprinkler for washing off remnants of coagulum and coagulant from a bottom
4 layer of wet (before drying) coagulum on walls of the sleeve former
5 layer of wet (before drying) coagulum on walls of the sleeve former
6 dry layer of latex on walls of a sleeve former
7 upper finishing bead on a sleeve
8 lower finishing bead on a sleeve
9 thin-walled body of a sleeve
10 upper bead rolling brush
11 lower bead rolling brush
12 coagulant tank
13 tank with latex suspension
41 dry former prior to dipping in coagulant
42 dipping a former into coagulant
43 washing off traces of coagulant following removal of a former from coagulant
44 dipping a former covered with dry coagulant into latex suspension
45 washing off loose latex coagulum from a bottom of a former following removal of the former from latex

DETAILED DESCRIPTION OF THE INVENTION

Figure 6:
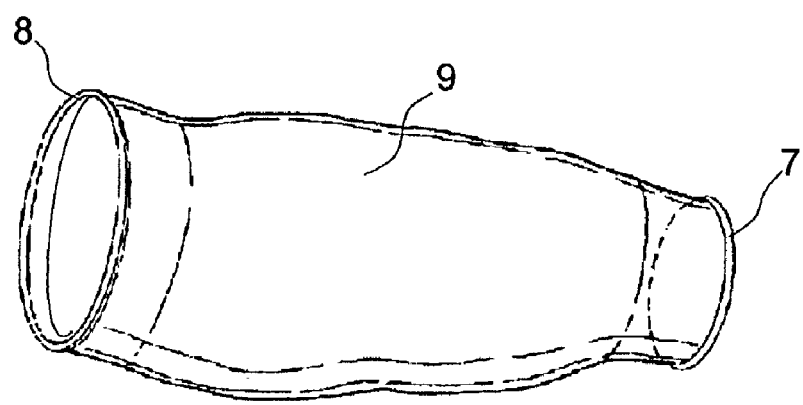
FIG. 6 is a general view of an opened at both ends thin-walled elastomeric sleeve of complex configuration.

An opened at both ends elastomeric sleeve of complex configuration, consisting of a thin-walled body (9) finished at both ends with rolled beads (7) and (8), is illustrated by FIG. 6. The present invention suggests that this kind of sleeves be produced by dip molding process, using specially constructed formers.

Dip molding technology presents an inherent contradiction which precludes or renders prohibitively costly manufacturing of sleeves finished with rolled beads at both ends. When a former such as the one for a condom or a glove is dipped into latex its lower end is naturally submerged in latex suspension, causing the resulting article inevitably to have lower end closed. In case of making a sleeve this presents a problem since the lower end has to be opened. However, the rubber before curing is too sticky to easily cut off the lower end, whereas after curing, when it is easy to cut, it loses its self-adhesion property wherefore cannot be beaded. The purpose of present invention is to overcome this contradiction.

This goal is achieved by overlaying a bottom of a sleeve former (2) by a layer of strongly hydrophobic material such as PTFE which prevents formation of coagulum layer on said bottom. Further on it is necessary to provide conditions for easy removal of loose coagulum layer from said bottom following the stage of dipping the former into latex suspension. This invention prescribes that coagulum is removed from former bottoms by means of installing at certain stages of dipping process timed and precisely pointed sprinklers, which have to be turned on momentarily while formers are situated in the position where bottoms and only bottoms of formers get in the way of water streams.

Figure 4:
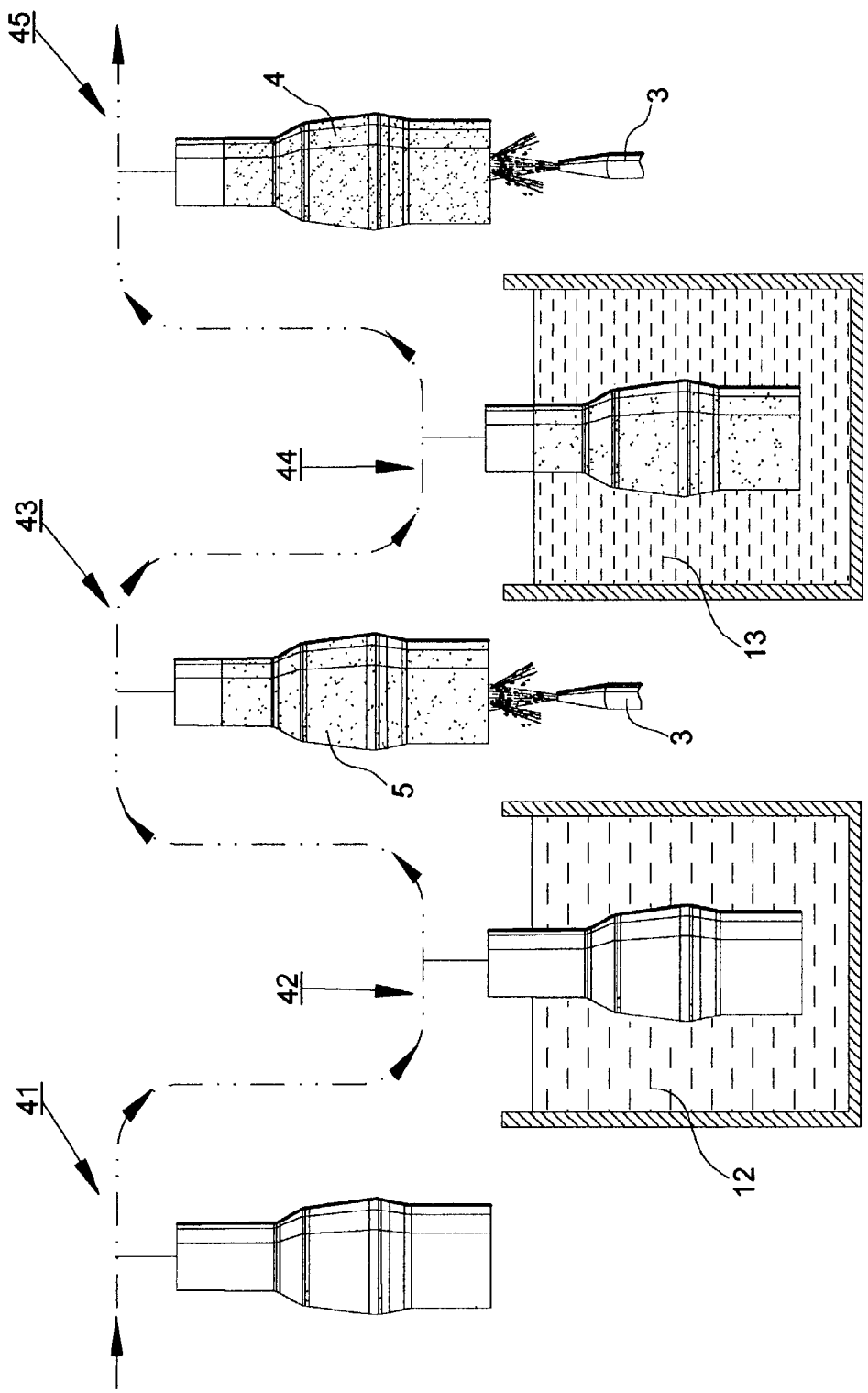
FIG. 4 is a schematic view of a part of a sleeve forming process employing a dip molding method. This view reflects dipping a former in coagulant and in latex suspension with subsequent washing the former bottom.

FIG. 4 schematically illustrates the process described above. Initially clean and dry former (shown in the position 41) is sequentially moved to the coagulant dipping stage (42) where it is dipped into a coagulant tank (12) with subsequent drying stage (not shown), where a coagulant layer (5) is formed on a former. Next the former is moved to latex dipping stage (44) is dipped into a latex suspension tank (13) after which, coated by layer of coagulum (4) it is moved to the bottom washing stage (45) where sprinkler or sprinklers (3) wash off loose coagulum from the bottom. At this stage certain measures must be taken (by proper timing and aiming) to preclude water jets from getting on walls of the former in order to leave coagulum layer (4) intact. FIG. 4 shows an additional optional stage (43) succeeding dipping into coagulant (42). At this stage traces of coagulant may be washed off the bottom in the same manner as coagulum is washed off in stage (45). Normally this stage is redundant because due to low viscosity no coagulant remains on PTFE layer after dipping.

Figures 3A, 3B:
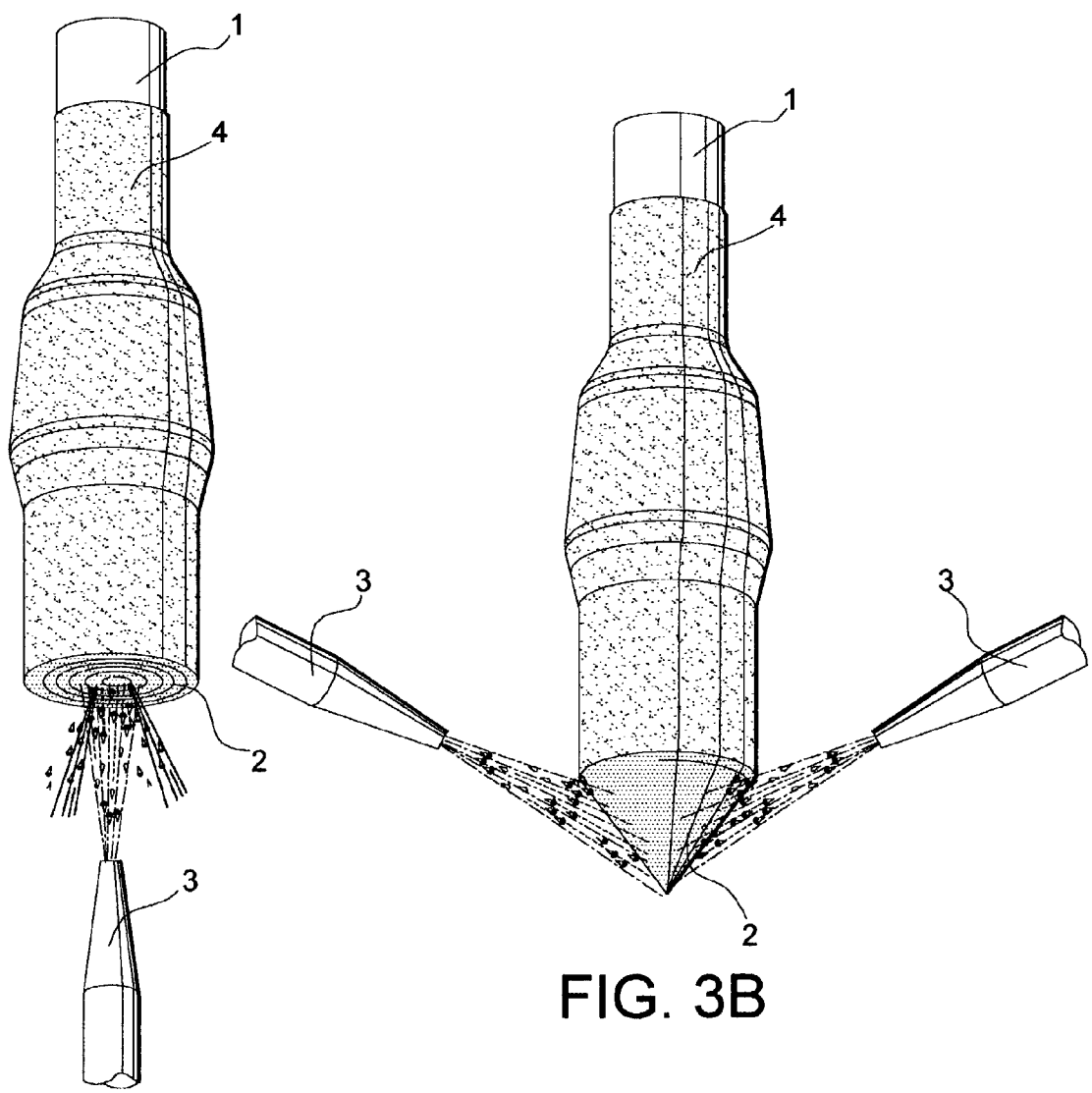
FIG. 3A shows a process of washing off traces of latex from a flat bottom of a sleeve former. This figure reflects a configuration for the preferred embodiment of the present invention.
FIG. 3B shows a process of washing off traces of latex from a conical bottom of a sleeve former. This figure reflects a configuration of one of alternative embodiments of the present invention.

A sleeve former should be normally constructed with a hollow or solid elongated body (1), made of metal, ceramics or another impermeable and heat resistant material. Different embodiments vary by shapes of bottoms (2). In the preferred embodiment of the former the bottom is flat and positioned perpendicular to the longitudinal axis of the body as shown in FIG. 1. The overlaying PTFE may be applied as a coating layer directly to the material. Conversely a thin sheet of PTFE may be attached to the bottom. Gluing with epoxy is one possibility. During a washing process a water jet from a sprinkler (3) must be pointed at the bottom (2) in the direction more or less parallel to the longitudinal axes of the former as shown in FIG. 3A. Other washing fluids, for example alcohol, may be used in lieu of water.

Figure 2A:
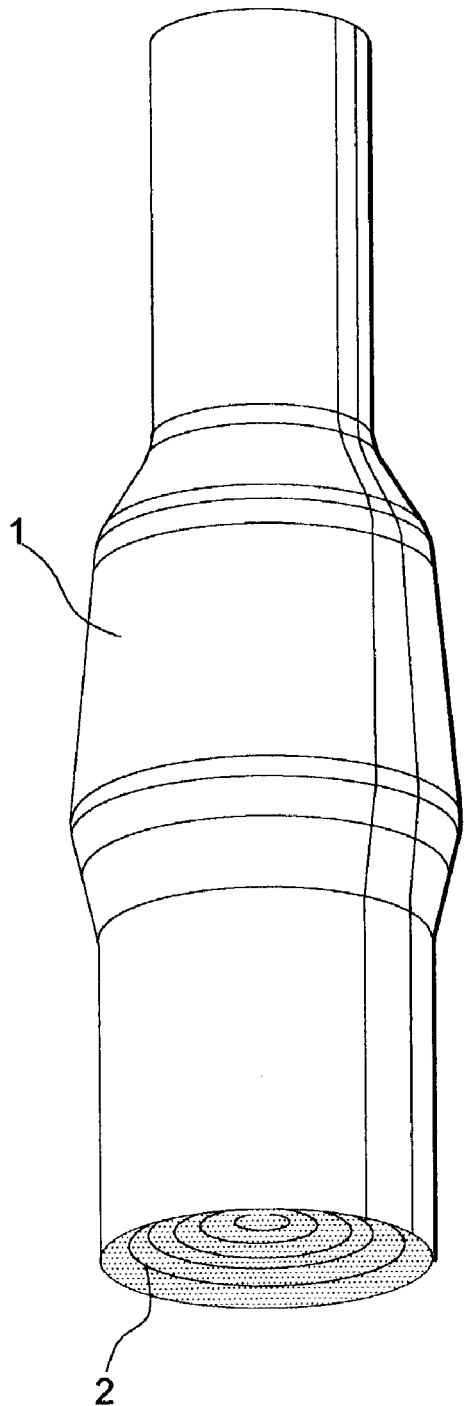
FIG. 2A is a perspective front-bottom view of a complex shape sleeve former with a concave bottom covered with hydrophobic coating.
Figure 2B:
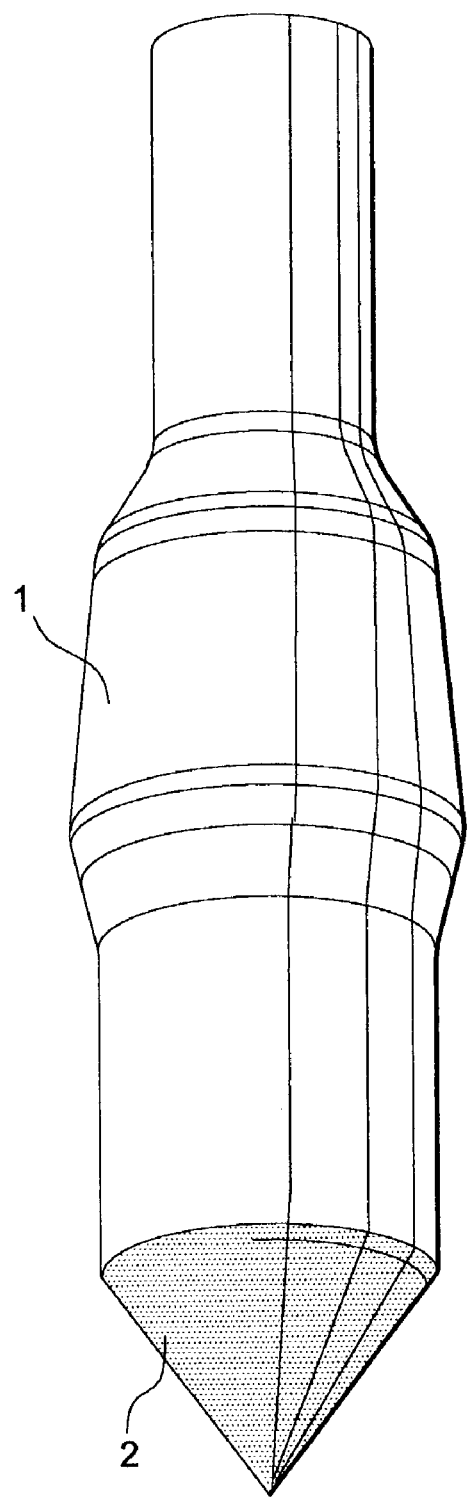
FIG. 2B is perspective front-bottom view of a complex shape sleeve former with a bottom of a conic shape covered with hydrophobic coating.

One alternative embodiment of a former has a concave bottom, as shown in FIG. 2B. This shape better prevents splashing of washing fluid over walls of the former, because a jet of water directed into the bottom parallel to the longitudinal axis gets concentrated within the bottom. Thus stronger stream and faster washing can be achieved.

Another alternative embodiment of a former is given a pointed or conical shape as shown in FIG. 2B. This embodiment requires that sprinklers (3) are installed around the former. Conversely the former may be rotated during a bottom washing stage, thus allowing a stream from one sprinkler to wash the whole surface of the bottom. Washing sprinklers eject fluid at an angle with longitudinal axis almost tangentially to the surface of the bottom cone (see FIG. 3B). This organization allows very efficient removal of coagulum from the bottom at the same time preventing squirting over walls of the former.

Figure 5:
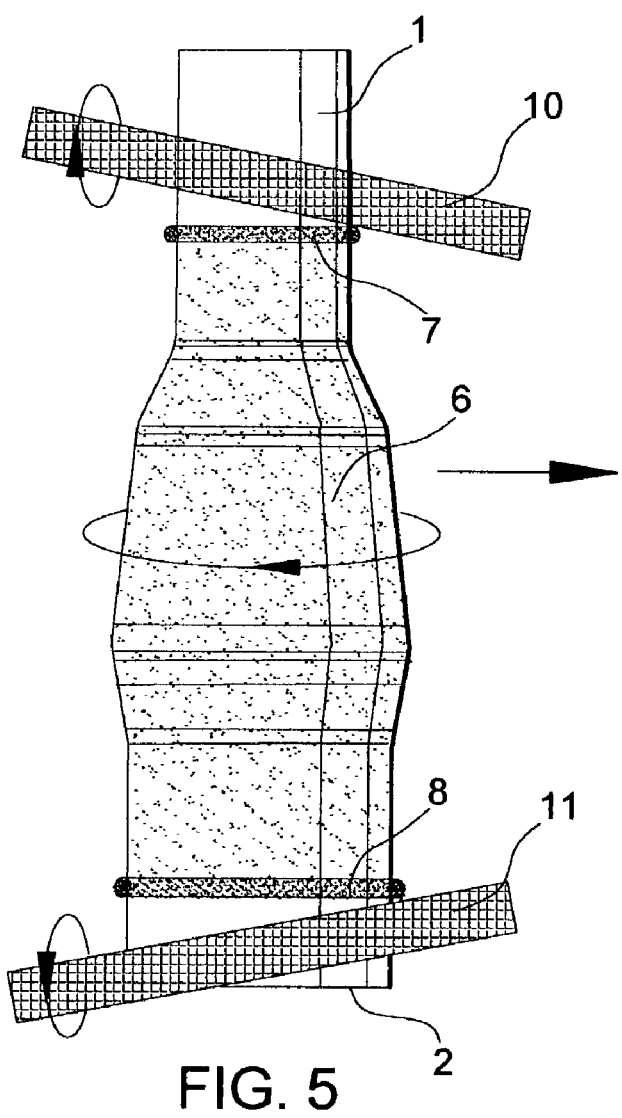
FIG. 5 is an elevational view of a sleeve former in a bead rolling stage of the production process.

Once the dipping and washing coagulum from the bottom are completed, the coagulum layer is dried whereby it forms a layer of still uncured solid natural or synthetic rubber (6). At this stage the former proceeds to the stage of bead forming. Rolling a bead may be performed manually on semi-automated lines or—on automated lines—by means of rolling brushes (FIG. 5). The present invention suggests that in case of automated lines lower brushes (11) are added along with normally employed in glove and condom making upper rolling brushes (10), hence forming two rolled beads (7) and (8) at both ends of a sleeve.

What is claimed is:

1. A mold for producing open at both ends elastomeric sleeves of complex configuration by utilizing dip molding technology, whereby a layer of coagulum from elastomeric suspension is deposited on external walls of a mold; and said mold consists of an elongated shaft of arbitrary shape with external surface of a bottom overlaid with hydrophobic material, wherein the bottom of said mold is substantially perpendicular to the longitudinal axis and has a concave shape.

2. A mold for producing open at both ends elastomeric sleeves of complex configuration by utilizing dip molding technology, whereby a layer of coagulum from elastomeric suspension is deposited on external walls of a mold; and said mold consists of an elongated shaft of arbitrary shape with external surface of a bottom overlaid with hydrophobic material, wherein the bottom of said mold has a convex pointed shape.

3. A mold for producing an elastomeric sleeve having openings at both ends utilizing dip molding technology, the mold comprising:
   an elongated body defining a longitudinal axis and having external walls including a side surface and a bottom surface; and
   a hydrophobic material overlying the bottom surface such that coagulant and suspension do not adhere to the bottom, wherein the bottom of the mold is substantially perpendicular to the longitudinal axis and has a concave shape.

4. A mold for producing an elastomeric sleeve having openings at both ends utilizing dip molding technology, the mold comprising:
   an elongated body defining a longitudinal axis and having external walls including a side surface and a bottom surface; and
   a hydrophobic material overlying the bottom surface such that coagulant and suspension do not adhere to the bottom, wherein the bottom of the mold has a convex pointed shape.

5. A mold of claim 3, wherein the hydrophobic material is polytetrafluoroethylene (PTFE).

6. A mold of claim 3, wherein the elongated body is formed of impermeable and heat resistant material.

7. A mold of claim 6, wherein the material of the elongated body is a ceramic.

* * * * *